Patented Aug. 31, 1937

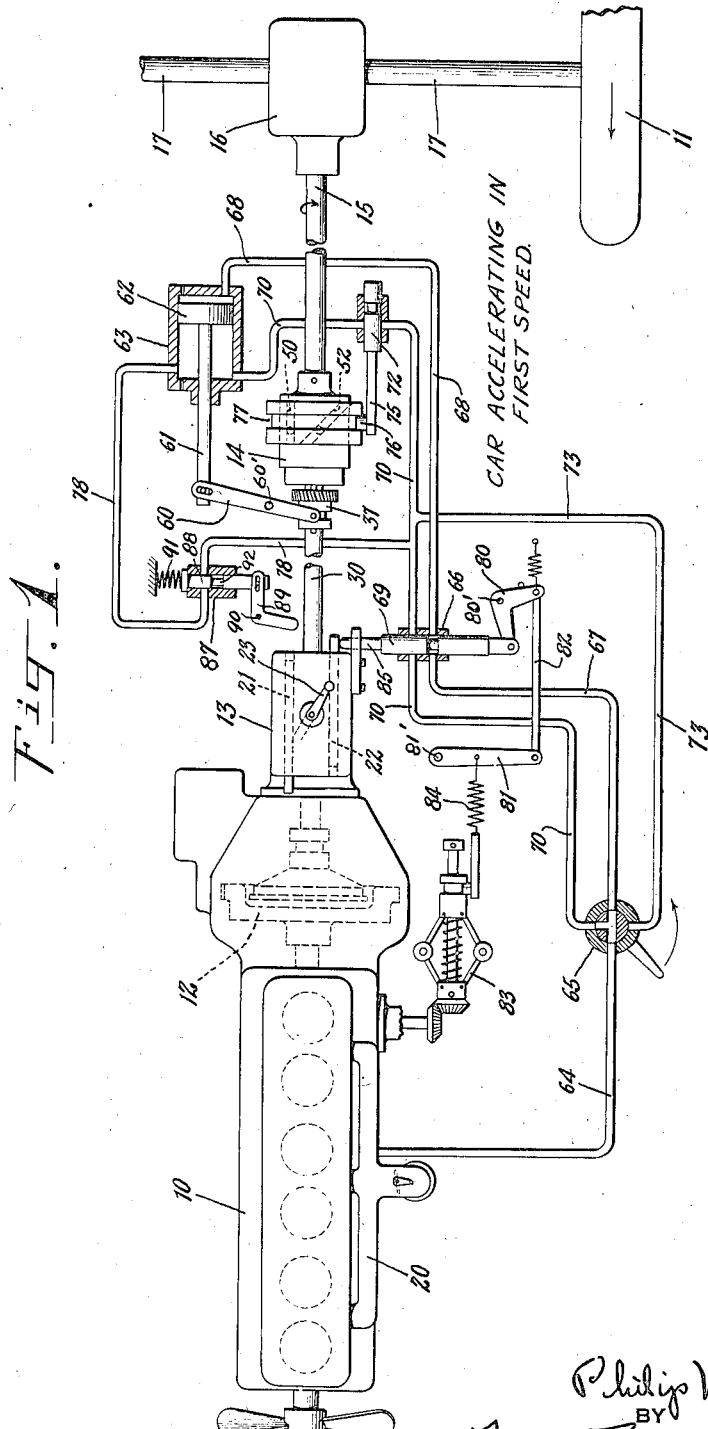

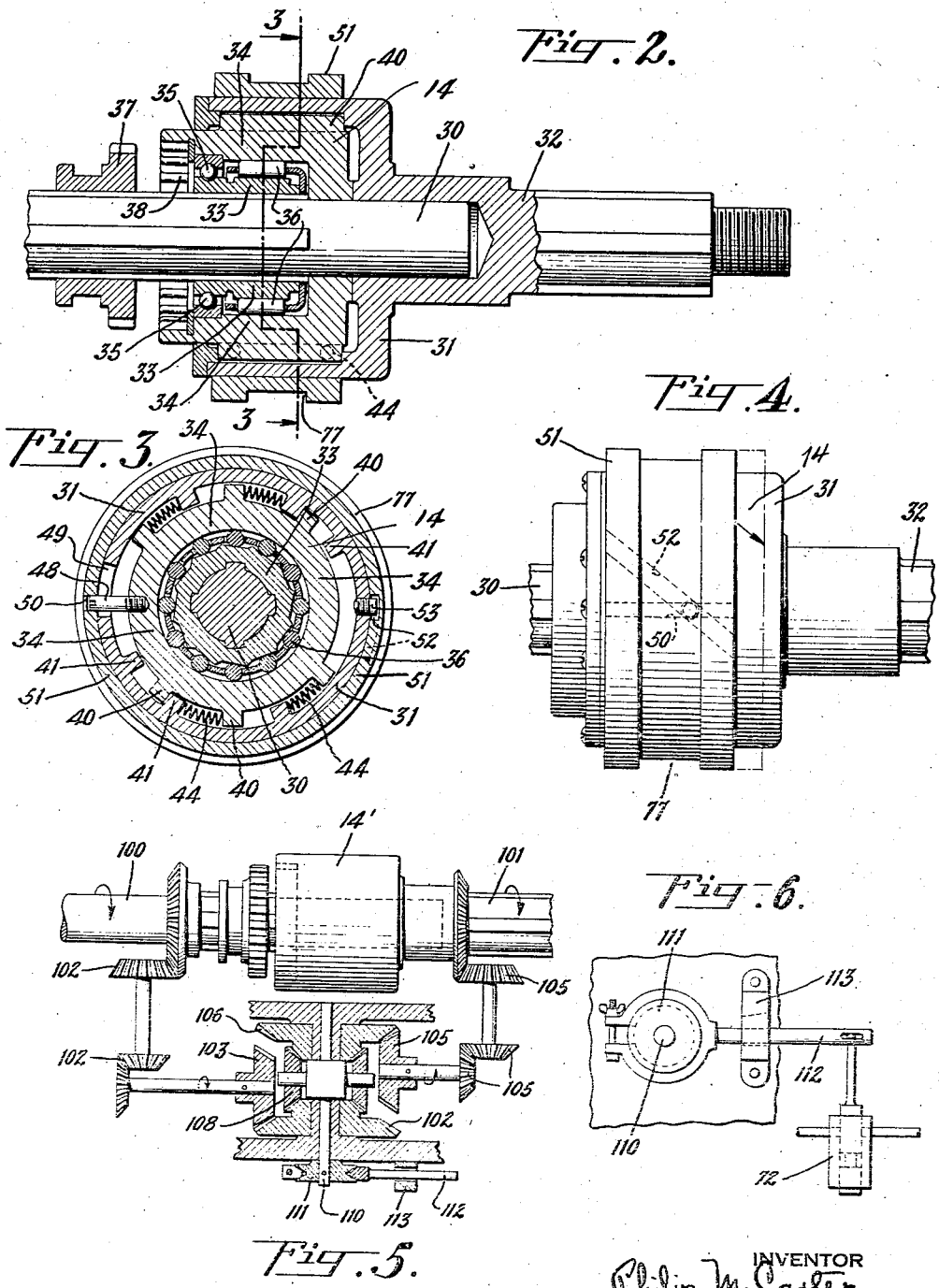

2,091,468

UNITED STATES PATENT OFFICE 2,091,468

FREEWHEEL CONTROL

Philip M. Carter, Detroit, Mich.

Application February 25, 1935, Serial No. 8,131
Renewed January 15, 1937

15 Claims. (Cl. 192—3.5)

The present invention relates to automotive vehicles and more particularly to a novel and improved transmission for such vehicles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 1 is a diagrammatic view showing the interconnection of the various parts of the present illustrative embodiment of the invention;

Figure 2 is a central longitudinal section taken through a free wheeling device for use in connection with the present invention;

Figure 3 is a cross sectional view taken on the line 3—3 of Figure 2;

Figure 4 is a side elevation of the device shown in Figures 2 and 3;

Figure 5 is a fragmentary detailed view showing, partly in section and diagrammatically a modified embodiment of the present invention; and, Figure 6 is a detailed side elevation of a valve operating arrangement for use in connection with the parts shown in Figure 5.

The present invention has for its object the provision of a novel and improved transmission for automotive vehicles. Another object is the provision of an automotive transmission having shiftable gears in which the usual clutch need not be operated in shifting from one gear to another. Still another object of the invention is the provision of a novel and improved selective gear transmission having a free-wheeling device in which the free wheeling device is automatically locked against overrunning under certain conditions, and preferably may be so locked at will.

The invention provides a transmission having a clutch, free-wheeling unit, and manually or automatically actuated selective gear transmission connecting the motor with the vehicle wheels, in which the clutch need be operated only in starting and stopping, and also in which the free-wheeling unit is automatically locked against overrunning so that the engine may be driven from the vehicle wheels when the vehicle is travelling in excess of a predetermined speed and in a certain gear or gears, or may be so locked when it is desired to utilize the compression of the engine as a braking force.

It will be understood that the foregoing general description and the following detailed description as well, are exemplary and explanatory of the invention, but are not restrictive thereof.

Referring now in detail to the illustrative embodiment of the present invention as shown in the accompanying drawings, the invention is shown in connection with an automotive vehicle having a motor 10 driving vehicle wheels 11 through a clutch 12, selective gear transmission 13, free wheeling unit 14, propeller shaft 15, differential 16 and rear axle 17. The motor may be an internal combustion motor of conventional construction having an intake manifold 20 which serves to provide the suction which is used to operate certain of the elements of the present embodiment.

The automatic or manually operated transmission 13 may also be of conventional construction, and its gear shifting rod 21 serves to shift the gears from neutral to first or reverse positions, while gear shifting rod 22 serves to shift the gears from neutral to second or third speed position, by the operation of gear set lever 23. In its forward position gear shifting rod 22 shifts the gears to high-speed position.

The free-wheeling unit forming a part of the present invention is shown in detail in Figures 2, 3, and 4 and comprises a shaft 30 driven by the motor through the transmission 13. Shaft 30 extends rearwardly and is rotatably journalled within the bore of cup or shell 31 formed integrally with alined shaft 32 which is connected to the propeller shaft 15 by means of a universal coupling (not shown). Splined to shaft 30 and axially immovable thereon, is the inner race 33 of the free-wheeling unit concentric with the outer free-wheeling race 34. A ball bearing 35 is provided at the forward end of race 34, and the inner race 33, rollers 36, and ball bearing 35 may be of substantially conventional construction but the outer race 34 is freely rotatable on shaft 30. A positive toothed clutch disc 37 is also splined to shaft 30 and is axially movable thereon, being engageable with and disengageable from the corresponding teeth 38 on the inner forward portion of outer race 34, and when engaged positively locks the outer race 34 to the shaft 30, thereby preventing overrunning action of the free-wheeling unit.

The outer surface of race 34 is splined or axially ribbed as at 40, these ribs being spaced similarly to and closely fitted within the corresponding ribs 41 formed on the inner surface of the shell 31, while springs 44 are provided between the ribs 40 and 41, tending to rotate the shell 31 relatively to the race 34. Springs 44 are so positioned that when the car is accelerating they are compressed by the relative rotation of the race 34 and shell 31, and on deceleration or when the free-wheeling unit operates, they cause a reverse relative rotation of the race 34 and shell 31.

Controlling means are provided shiftable between two positions in accordance with the torque-transmitting condition of the free-wheeling unit, and adapted to assume one position when the free-wheeling unit is transmitting power from the motor, and to assume another position when the free-wheeling unit is acting as an overrunning clutch. For this purpose a short radial pin 48 is provided secured to the outer race 34 and projecting outwardly through a circumferential slot 49 in shell 31, and projecting into a shallow slot 50 on the inside of collar 51, slot 50 extending axially of collar 51. Collar 51 is circumferentially movable on the outside of shell 31, and is moved axially therealong, as it is rotated by pin 48, by means of the helical slot 52 formed on the inner surface of collar 51; cooperating with a pin 53 projecting radially from shell 31.

Means are provided for axially sliding the toothed disc 37 into and out of engagement with the teeth 38 on race 34, and for this purpose a fork 60 is pivoted at 60', connected at one end to the disc 37 and at its other end to the piston rod 61 of the piston 62. Piston 62 is slidable in either direction within the double-ended cylinder 63, depending upon which end of the cylinder has the vacuum applied to it.

Means are provided for applying suction to the rear end of piston 62 to render the free-wheeling unit operative, that is, to prevent driving of the motor by the vehicle wheels, and pipe 64 extends from the intake manifold 20, through three-way valve 65 and is connected with valve 66 by means of pipe 67, and from valve 66 to the right end of cylinder 63 by means of pipe 68. The valve slide 69 is provided with a single opening so that pipes 67 and 68 are connected only in one position of the slide.

For applying suction to the left end of cylinder 62 to slide disc 37 into mesh with teeth 38, a pipe 70 extends from valve 65 to valve 66, and from valve 66 to valve 72 and thence to the left end of cylinder 63.

A by-pass pipe 73 is provided connecting valve 65 with pipe 70 between valves 66 and 72. Valve 66 is so formed that lines 67 and 70 may be connected with pipe 64, or pipes 67 and 73 may be so connected, but pipes 67 and 73 cannot be simultaneously connected to pipe 64.

For permitting disc 37 to be engaged with teeth 38 only when the motor is driving the wheels, as in accelerating, means are provided for controlling the position of valve 72 in accordance with the torque-transmission of the free-wheeling unit. As embodied, the valve slide of valve 72 is connected for movement by axial movement of the collar 51 by means of link 75, carrying a roller 76 running in the groove 77 extending circumferentially of the collar 51. When the freewheeling unit 14 is transmitting the power of the motor 10 to the rear wheels 11, valve 72 is moved to its open position, and as soon as the transmission of power ceases, the valve is moved to closed position.

Means are provided for applying suction to line 68 or line 70 in accordance with the speed of the vehicle, and for this purpose the valve slide 69 is connected to bell crank 80, pivoted at 80' which in turn is connected to lever 81 pivoted at 81', by means of link 82, and lever 81 is moved back and forth by means of the motor driven governor 83 which is connected to lever 81 by means of the tension spring 84. The gear shifting rod 22 is of such a length and is so positioned with reference to the end 85 of slide 69 that the slide 69 may pass only when the gears are in high-gear position and when the engine speed is in excess of a predetermined speed, say 15 M. P. H.

For maintaining the free-wheeling unit locked against overrunning at all speeds, and for so locking it at any speed in any gear once its parts have been synchronized, the manually actuated valve 65 is provided and may be rotated counterclockwise to connect both pipes 70 and 73 with the main vacuum line 64.

For reverse gear operation a valve 87 is provided in line 78 connected between line 73 and the front of cylinder 63, this valve being normally closed, but opened by movement of slide rod 21 to reverse gear position. For effecting this opening, valve slide 88 is connected to bell crank 89, pivoted at 90 and adapted to be swung by engagement with slide rod 21 in reverse gear position. A spring 91 cooperates with the other end of slide 88 to hold the valve passageway 92 normally in valve closing position.

In the illustrative embodiment of the invention shown in Figures 5 and 6, a differential is utilized as the means to control the valve 72. As shown in this modified embodiment, the freewheeling unit 14' is of conventional construction and is adapted to permit the propeller shaft 100 to rotate faster than the transmission shaft 101. Gears 102 are provided for driving the differential gear 103 from shaft 100, and gears 105 are provided for driving the differential gear 106 from propeller shaft 101. When shafts 100 and 101 are rotating at the same speed, gears 102 and 106 are rotated oppositely to each other, with the angular speed of gear 102 only very slightly (1% or 2%) in excess of the angular speed of gear 106. Gears 102 and 106 drive the differential pinions 108 which are revolubly mounted on shaft 110, so that when the free-wheeling unit 14' is operative and the motor is operating at less than vehicle-speed, the pulley 111 is rotated counter-clockwise, thereby moving arm 112 counter-clockwise until it is stopped by stop bracket 113, due to the frictional engagement of arm 112 with pulley 111. At its outer end arm 112 is connected to the valve slide of valve 72, moving the valve slide to open position on synchronization of the shafts 100 and 101, and thereafter arm 112 continues to slide on pulley 111 as the pulley is slowly rotated.

In other respects, this modified embodiment may be of the same construction as the form shown in Figures 1 to 4 of the drawings.

In the operation of the mechanism shown in Figures 1 to 4, the engine is running, the transmission gears are in neutral position and the free-wheeling unit is in operative position. The operator then depresses the clutch pedal to disengage the clutch, shifts the gears to first speed position, and engages the clutch as the throttle is opened, thereby setting the vehicle in motion. The valve 66 remains in the position shown in Figure 1, its movement under the influence of the governor being blocked by the shift rod 22.

When the operator desires to shift to second speed, the throttle is closed, decelerating the motor 10, and the free-wheeling device overruns to relieve the transmission of any torque applied to it from the wheels 11, and the gears may then be shifted to second speed position without use of the clutch 12.

The shift to high-gear is accomplished in the same manner, but as soon as the vehicle speed exceeds a predetermined amount, the valve slide is projected past the end of rod 22, opening the valve in line 70, and permitting the suction to be applied to the left end of cylinder 63 as soon as the shafts 30 and 32 have been synchronized, thereby positively locking these shafts together and rendering the free-wheeling unit inoperative causing the motor to be driven by the vehicle wheels. The car then remains in compression until the vehicle speed is reduced below the predetermined speed, shifting the slide valve 69 to connect lines 67 and 68, thereby rearwardly moving piston 62 and the free-wheeling unit can overrun the motor.

When the operator desires to travel in compression in any gear, as when descending a grade in second speed, the manually controlled valve 65 is moved to connect line 64 to lines 70 and 73, and when the shafts 30 and 32 are next synchronized, the piston is moved rearwardly to positively lock the free-wheeling unit by shifting of the toothed disc 37.

For reverse gear position of the gears, the operator first shifts the valve 65 to compression position, depresses the clutch pedal to disengage clutch 12, moves gear set lever to reverse position, causing slide rod 21 to open valve 77 and thereby applying suction to the end of the piston 62 to lock the free-wheeling unit.

The modified embodiment of Figures 5 and 6 operates in the same manner, with the exception of the actuating means for the valve 72. The operation of these parts, however, will be clear from the description of the parts above.

If it is desired to avoid pedal operation of the clutch 12 in starting and stopping, clutch 12 may be formed as an automatic clutch, such as a conventional type of centrifugal clutch adapted to be engaged by centrifugal force when the motor 10 rotates faster than idling speed. When so constructed, the engagement of the clutch is automatic in starting and it is automatically disengaged in stopping, remaining engaged when the free wheeling unit 14 is silenced until the car has been slowed to a low speed in any gear.

The invention in its broader aspects is not limited to the specific mechanisms shown and described but departures may be made therefrom within the scope of the accompanying claims without departing from the principles of the invention and without sacrificing its chief advantages.

What I claim is:—

1. In an automotive vehicle having a motor and driving wheels connected with the motor by a clutch, selective gear transmission and free-wheeling unit adapted to transmit power uni-directionally or bi-directionally, the combination of means for automatically holding the free-wheeling unit against overrunning in certain transmission speeds and means for preventing operation of the first means while the free-wheeling unit is overrunning.

2. In an automotive vehicle having a motor and driving wheels connected with the motor by a clutch, selective gear transmission and free-wheeling unit adapted to transmit power uni-directionally or bi-directionally, the combination of means for automatically holding the free wheeling unit against overrunning above a predetermined motor speed, means for preventing operation of the first means in certain transmission speeds and means for rendering the preventive means inoperative.

3. An automobile transmission system for driving the automobile wheels from a motor including in combination a clutch, selective gear transmission, a free-wheeling unit adapted to transmit power uni-directionally or bi-directionally, fluid pressure means for holding the free-wheeling unit against overrunning, means for controlling the application of pressure to said means in accordance with motor speed, and means controlling the application of pressure to said means in accordance with the transmission gear position.

4. An automobile transmission system for driving the automobile wheels from a motor including in combination a clutch, selective gear transmission, a free-wheeling unit adapted to transmit power uni-directionally or bi-directionally, fluid pressure means for holding the free-wheeling unit against overrunning, means for controlling the application of pressure to said means in accordance with motor speed, means controlling the application of pressure to said means in accordance with the transmission gear position and means for preventing silencing of the free-wheeling unit while it is overrunning.

5. An automobile transmission system for driving the automobile wheels from a motor including in combination a centrifugal clutch, a sliding gear transmission, a free-wheeling unit adapted to transmit power uni-directionally or bi-directionally, fluid pressure means for holding the free-wheeling unit against overrunning, means for controlling the application of pressure to said means in accordance with motor speed, means controlling the application of pressure to said means in accordance with the transmission gear position and means for preventing silencing of the free-wheeling unit while it is overrunning.

6. An automobile transmission system for driving the automobile wheels from a motor including in combination a centrifugal clutch, a sliding gear transmission, a free-wheeling unit adapted to transmit power uni-directionally or bi-directionally, fluid pressure means for holding the free-wheeling unit against overrunning, means for controlling the application of pressure to said means in accordance with motor speed, means controlling the application of pressure to said means in accordance with the transmission gear position and manual means for rendering said third means inoperative.

7. An automobile transmission system for driving the automobile wheels from a motor including in combination a clutch automatically disengaged below certain motor speeds, a sliding gear transmission, a free-wheeling unit adapted to transmit power uni-directionally or bi-directionally, fluid pressure means for holding the free-wheeling unit against overrunning, means for controlling the application of pressure to said means in accordance with motor speed, and means controlling the application of pressure to said means in accordance with the transmission gear position.

8. An automobile transmission system for driving the automobile wheels from a motor including in combination a clutch automatically disengaged below certain motor speeds, a sliding gear transmission, a free-wheeling unit adapted to transmit power uni-directionally or bi-directionally, fluid pressure means for holding the free-wheeling unit against overrunning, means for controlling the application of pressure to said means in accordance with motor speed, means controlling the application of pressure to said means in accordance with the transmission gear position and manual means for rendering said third means inoperative.

9. An automobile transmission system for driving the automobile wheels from a motor including in combination a clutch automatically disengaged below certain motor speeds, a sliding gear transmission, a free-wheeling unit adapted to transmit power uni-directionally or bi-directionally, fluid pressure means for holding the free-wheeling unit against overrunning, means for controlling the application of pressure to said means in accordance with motor speed, means controlling the application of pressure to said means in accordance with the transmission gear position and means for preventing silencing of the free-wheeling unit while it is overrunning.

10. An automobile transmission system for driving the automobile wheels from a motor including in combination a clutch, selective gear transmission, a free-wheeling unit adapted to transmit power uni-directionally or bi-directionally, fluid pressure means for holding the free-wheeling unit against overrunning, means for controlling the application of pressure to said means in accordance with motor speed, means controlling the application of pressure to said means in accordance with the transmission gear position, means for preventing silencing of the free-wheeling unit while it is overrunning and manual means for rendering said third means inoperative.

11. An automobile transmission system for driving the automobile wheels from a motor including in combination a clutch, selective gear transmission, a free-wheeling unit adapted to transmit power uni-directionally or bi-directionally, fluid pressure means for holding the free-wheeling unit against overrunning, means for controlling the application of pressure to said means in accordance with motor speed, means controlling the application of pressure to said means in accordance with the transmission gear position and manual means for rendering said third means inoperative.

12. An automobile transmission for driving the automobile wheels from a motor including in combination a clutch automatically disengaged below certain motor speeds, a sliding gear transmission, a free-wheeling unit adapted to transmit power uni-directionally or bi-directionally, fluid pressure means for holding the free-wheeling unit against overrunning, a motor speed controlled valve controlling the application of pressure for holding the free-wheeling unit against overrunning, a valve controlled by overrunning of the unit preventing operation of the pressure means for holding the free-wheeling unit against overrunning when the unit is overrunning, means for blocking operation of the first valve in certain transmission speeds and a manual valve for by-passing the first valve.

13. An automobile transmission for driving the automobile wheels from a motor including in combination a clutch automatically disengaged below certain motor speeds, a sliding gear transmission, a free-wheeling unit adapted to transmit power uni-directionally or bi-directionally, fluid pressure means for holding the free-wheeling unit against overrunning, a motor speed controlled valve controlling the application of pressure for holding the free-wheeling unit against overrunning, a valve controlled by overrunning of the unit preventing operation of the pressure means for holding the free-wheeling unit against overrunning when the unit is overrunning, means for blocking operation of the first valve in certain transmission speeds, a manual valve for by-passing the first valve and means for applying pressure to lock the unit against overrunning when the transmission is in reverse gear position.

14. An automobile transmission for driving the automobile wheels from a motor including in combination a clutch, a sliding gear transmission, a free-wheeling unit, fluid pressure means for holding the free-wheeling unit against overrunning, a motor speed controlled valve controlling the application of pressure for holding the free-wheeling unit against overrunning, a valve controlled by overrunning of the unit preventing operation of the pressure means for holding the free-wheeling unit against overrunning when the unit is overrunning, means for blocking operation of the first valve in certain transmission speeds and a manual valve for by-passing the first valve.

15. An automobile transmission for driving the automobile wheels from a motor including in combination a clutch, a sliding gear transmission, a free-wheeling unit, fluid pressure means for holding the free-wheeling unit against overrunning, a motor speed controlled valve controlling the application of pressure for holding the free-wheeling unit against overrunning, a valve controlled by overrunning of the unit preventing operation of the pressure means for holding the free-wheeling unit against overrunning when the unit is overrunning, means for blocking operation of the first valve in certain transmission speeds, a manual valve for by-passing the first valve and means for applying pressure to lock the unit against overrunning when the transmission is in reverse gear position.

PHILIP M. CARTER.